(12) United States Patent
Candy (10) Patent No.: US 9,250,348 B2
(45) Date of Patent: Feb. 2, 2016

(54) TRANSMIT SIGNAL OF A METAL DETECTOR CONTROLLED BY FEEDBACK LOOPS

(71) Applicant: Minelab Electronics Pty Limited, Torrensville, South Australia (AU)

(72) Inventor: Bruce Halcro Candy, Torrensville (AU)

(73) Assignee: Minelab Electronics Pty Limited, Torrensville (AU)

( * ) Notice: Subject to any disclaimer, the term of this patent is extended or adjusted under 35 U.S.C. 154(b) by 0 days.

(21) Appl. No.: 13/720,828

(22) Filed: Dec. 19, 2012

(65) Prior Publication Data
US 2013/0154649 A1    Jun. 20, 2013

(30) Foreign Application Priority Data

Dec. 19, 2011    (AU) .............................. 2011905296
Dec. 23, 2011    (AU) .............................. 2011905417

(51) Int. Cl.
*G01V 3/10*    (2006.01)
*G01V 3/15*    (2006.01)

(52) U.S. Cl.
CPC .. *G01V 3/107* (2013.01); *G01V 3/15* (2013.01)

(58) Field of Classification Search
CPC .................. G01V 3/107; G01V 3/15

USPC ........................................... 324/67, 326–329
See application file for complete search history.

(56) References Cited

U.S. PATENT DOCUMENTS

| | | |
|---|---|---|
| 4,410,926 A | 10/1983 | Hafner et al. |
| 7,652,477 B2 | 1/2010 | Candy |
| 7,924,012 B2 | 4/2011 | Candy |
| 2008/0297158 A1 | 12/2008 | Heger et al. |
| 2010/0141247 A1 | 6/2010 | Candy |
| 2012/0146647 A1 | 6/2012 | Candy |

FOREIGN PATENT DOCUMENTS

| | | | |
|---|---|---|---|
| CA | 1064584 A | 10/1979 | |
| WO | WO 2008006178 A1 * | 1/2008 | ............... G01V 3/10 |
| WO | WO 2008040089 | 4/2008 | |

OTHER PUBLICATIONS

Ferreira, J. A. et al., A Square-Wave Current Inverter for Aircraft-Mounted Electromagnetic Surveying Systems, IEEE Transactions on Industry Applications, Jan./Feb. 2004, pp. 213-219, vol. 40, No. 1.

* cited by examiner

*Primary Examiner* — Jay Patidar
(74) *Attorney, Agent, or Firm* — The Webb Law Firm

(57) ABSTRACT

A metal detector has one or more feedback loops to control its repeating transmit signal cycle so that there is no reactive voltage drop across the transmit coil of the metal detector during at least one receive period of the metal detector.

15 Claims, 6 Drawing Sheets

TRANSMIT SIGNAL OF A METAL DETECTOR CONTROLLED BY FEEDBACK LOOPS

CROSS REFERENCE TO RELATED APPLICATIONS

This application claims priority to AU Provisional Patent No. AU2011905296, filed Dec. 19, 2011, titled "A Transmit Signal Of A Metal Detector"; and AU Provisional Patent No. AU2011905417, filed Dec. 23, 2011, titled "Coil Arrangement." The entire content of each of these applications are hereby incorporated by reference.

TECHNICAL FIELD

This invention relates to metal detectors that are time-domain detectors.

BACKGROUND

The general forms of most metal detectors which interrogate soils are either hand-held battery operated units, conveyor-mounted units, or vehicle-mounted units. Examples of hand-held battery operated units include detectors used to locate gold, explosive land mines or ordnance, coins and treasure. An example of a conveyor-mounted unit is a fine gold detector used in ore mining operations, and an example of a vehicle-mounted unit includes a detector to locate buried land mines.

These electronic metal detectors usually include transmit electronics for generating a repeating transmit signal cycle, which is applied to an inductor, for example a transmit coil, which transmits a resulting alternating magnetic field (also known as a transmit magnetic field).

Time-domain metal detectors usually include switching electronics, within the transmit electronics, that switches various voltages from various power sources to the transmit coil for various periods in a repeating transmit signal cycle.

Metal detectors contain receive electronics which processes a receive magnetic field to produce an indicator output signal, the indicator output signal at least indicating the presence of at least some metallic targets under the influence of the transmit magnetic field.

Traditional PI (Pulse Induction) metal detectors are time-domain detectors, having a plurality of switches for switching at least first and second voltages from power sources, and zero volts for various durations, to generate a repeating transmit signal cycle with a fundamental frequency usually being in the range from tens of Hz to several kHz. The second voltage from a second power source is usually a low negative voltage, −6V for example, and is switched to the transmit coil during a low-voltage period, immediately followed by a back-emf period (a high-voltage period) of a first high voltage, for example +180V, switched from a first power source to the transmit coil usually via a forward-biased diode, then a zero-voltage period following the high-voltage period. The transmit electronics presents a low source impedance to the transmit coil during the low-voltage period and back-emf period, assuming that the coil is connected to the first power source, but presents a high impedance during the period in which critically damped decay of the back-emf occurs, and during the zero-voltage period when no transmit coil current flows and a magnetic signal is received by the receive electronics. During these high impedance periods, the said switching electronics output impedance is usually a function of the capacitance of the switching electronics in parallel with a resistor (e.g. 500Ω) whose value is usually selected to critically damp the self-resonance of the transmit coil connected to transmit electronics. As this period of relatively high impedance commences with a decay of a pulse induction back-emf period, the receive signal will contain a reactive component (X) during this decay period. Hence, to avoid contaminating the receive signal with this X component, usually most, if not all, of the receive signal processing of sampling, or synchronous demodulation, is delayed so as to occur during the period of zero-voltage after the back-emf has substantially decayed.

Eddy currents induced in metallic targets, such as small gold nuggets and fine gold chains, have short decay periods. The delay of the sampling, or synchronous demodulation, of the receive signal after the back-emf periods results in reduced sensitivity to those targets harbouring eddy currents with short time constants. However, the delay cannot be made too short because contamination of the receive signal with X component occurs if the receive sampling occurs when the transient output from the receive coil is significant. Hence, if the duration of the transient output from the receive coil can be reduced, the delay can be reduced, and targets with faster time constants targets can be detected without contamination from X.

A possible solution is detailed in WO2009/155668 where the repeating transmit signal cycle is monitored and controlled such that the receive signal is processed during a zero reactive voltage period during which a constant non-zero current is flowing through the transmit coil. As it is a zero reactive voltage period, there will be no contamination from X when the receive signal is processed. To create such a zero reactive voltage period, WO2009/155668 discloses a switched rectangular repeating transmit signal cycle.

The present invention teaches an alternative to the switched rectangular repeating transmit signal cycle.

BRIEF SUMMARY OF THE INVENTION

According to an aspect of the present invention, there is provided a metal detector for detecting a metallic target in a soil including: transmit electronics for generating a repeating transmit signal cycle, the repeating transmit signal cycle including at least one receive period and at least one non-zero transmit coil reactive voltage period; a transmit coil connected to the transmit electronics for receiving the repeating transmit signal cycle and generating a transmit magnetic field; a receive coil for receiving a receive magnetic field during the at least one receive period and providing a receive signal induced by the receive magnetic field; and receive electronics connected to the receive coil for processing the receive signal during the at least one receive period to produce an indicator output signal, the indicator output signal including a signal indicative of a presence of the metallic target when under an influence of the transmit magnetic field; wherein the repeating transmit signal cycle is generated such that a waveform of the repeating transmit signal cycle includes a substantially half-sine during the at least one non-zero transmit coil reactive voltage period, and that a current through the transmit coil is substantially constant and non-zero during the at least one receive period.

In one form, the repeating transmit signal cycle includes a high-voltage period, the high-voltage period followed by a very-low-voltage period; wherein the high-voltage period includes one of the at least one non-zero transmit coil reactive voltage period, and the very-low-voltage period includes one of the at least one receive period.

In one form, the repeating transmit signal cycle further includes a low-voltage period following the very-low-voltage period.

In one form, the repeating transmit signal cycle includes at least two different sequences, a first sequence and a second sequence, the first sequence including a first non-zero transmit coil reactive voltage period and a first receive period, and the second sequence including a second non-zero transmit coil reactive voltage period and a second receive period, and the second sequence is an inversion of the first sequence.

In one form, the metal detector further includes at least one negative feedback loop for controlling at least one characteristic of the repeating transmit signal cycle based on the same or at least one other characteristic of the repeating transmit signal cycle.

According to an aspect of the present invention, there is provided a repeating transmit signal cycle for generating a transmit magnetic field through a transmit coil in an operation to detect a metallic target in a soil, including: at least one receive period during which a current through the transmit coil is substantially constant and non-zero; and at least one non-zero transmit coil reactive voltage period during which a waveform of the repeating transmit signal cycle includes a substantially half-sine.

In one form, the repeating transmit signal cycle includes a high-voltage period, the high-voltage period followed by a very-low-voltage period; wherein the high-voltage period includes one of the at least one non-zero transmit coil reactive voltage period, and the very-low-voltage period includes one of the at least one receive period.

In one form, the repeating transmit signal cycle further includes a low-voltage period following the very-low-voltage period.

In one form, the repeating transmit signal cycle includes at least two different sequences, a first sequence and a second sequence, the first sequence including a first non-zero transmit coil reactive voltage period and a first receive period, and the second sequence including a second non-zero transmit coil reactive voltage period and a second receive period, and the second sequence is an inversion of the first sequence.

According to another aspect of the present invention, there is provided a method for detecting a metallic target in a soil including: generating a repeating transmit signal cycle, the repeating transmit signal cycle including at least one receive period and at least one non-zero transmit coil reactive voltage period; generating a transmit magnetic field for transmission through a transmit coil based on the repeating transmit signal cycle; receiving a receive magnetic field during the at least one receive period and providing a receive signal induced by the receive magnetic field; and producing an indicator output signal, the indicator output signal including a signal indicative of a presence of the metallic target when under an influence of the transmit magnetic field; wherein the repeating transmit signal cycle is generated such that a waveform of the repeating transmit signal cycle includes a substantially half-sine during the at least one non-zero transmit coil reactive voltage period, and that a current through the transmit coil is substantially constant and non-zero during the at least one receive period.

According to another aspect of the present invention, there is provided a coil arrangement for reducing non-linear motion signals from a receive signal of a metal detector transmitting a transmit signal, the transmit signal including a period of zero reactive voltage with non-zero transmit coil current.

In one form, the coil arrangement includes: a transmit coil for transmitting a transmit magnetic field; and two receive coils positioned at opposite sides of the transmit coil for receiving magnetic fields.

In one form, the coil arrangement includes: a transmit coil for transmitting a transmit magnetic field; and a receive coil with three loops for receiving magnetic fields, wherein a first loop is positioned entirely within horizontal limits of the transmit coil, and the remaining loops of the three loops have parts overlapping turns of the transmit coil.

In one form, the coil arrangement includes: a transmit coil for transmitting a transmit magnetic field; and a receive coil with two loops, each loop positioned at opposite sides of the transmit coil for receiving magnetic fields.

In one form, the coil arrangement includes: a transmit coil with two loops for transmitting a transmit magnetic field; and a receive coil with one loop for receiving magnetic fields; wherein the two loops of the transmit coil and the one loop of the receive coil form a concentric arrangement.

According to another aspect of the present invention, there is provided a metal detector for transmitting a transmit signal, the transmit signal including a period of zero reactive voltage with non-zero transmit coil current, the metal detector including a coil arrangement adapted to reduce non-linear motion signals from a receive signal of the metal detector.

To assist with the understanding of this invention, reference will now be made to the drawings:

DETAILED DESCRIPTION OF THE INVENTION

Figure 1:
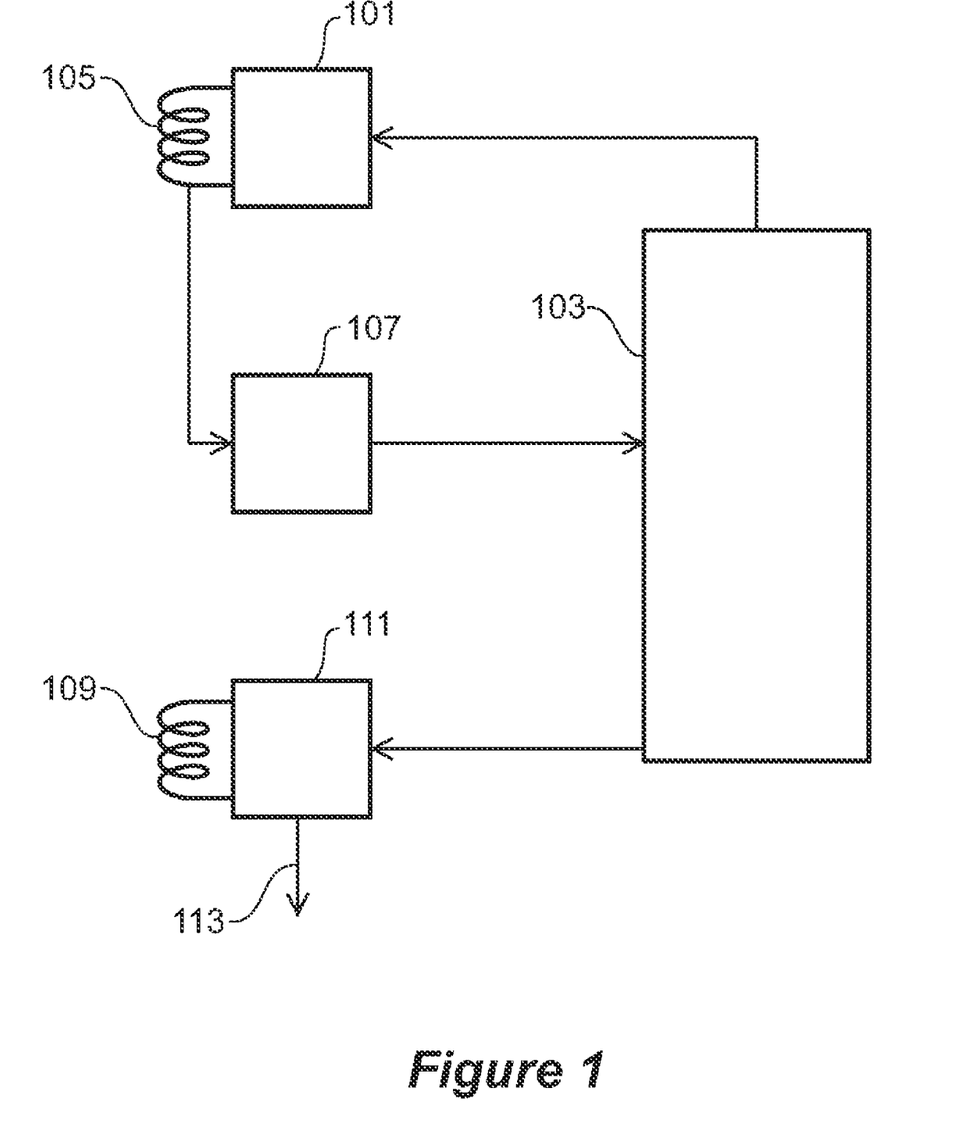
FIG. 1 depicts a general block diagram of a metal detector with a negative feedback circuit to monitor the transmit coil current.

FIG. 1 is a block diagram showing main parts of a metal detector. Transmit electronics 101 contains switches, and might also include linear elements controlled by timing electronics 103 to generate a repeating transmit signal cycle into a transmit coil 105 connected to the transmit electronics 101. The transmit coil 105 generates, in response to the repeating transmit signal cycle from transmit electronics 101, a transmit magnetic field, which is directed into a soil medium (not shown), in which there may be metallic targets. The coil can be of various forms well known to those skilled in the art. A negative feedback loop amplifier 107 senses the current in the transmit coil 105 to provide a control signal to timing electronics 103 to control a duration and/or magnitude of the repeating transmit signal cycle, thereby forming a feedback loop.

A receive coil 109 which is located in the vicinity of the soil medium is connected to receive electronics 111. The receive magnetic field induces a receive signal (an electromotive force or emf signal) in the receive coil 109, and the receive signal is processed by receive electronics 111 to generate an indicator output signal 113 to indicate the presence of metals under the influence of the transmit magnetic field. Receive electronics 111 also receives timing information from timing electronics 103.

Some of the functions of the receive electronics 111, such as those performed by the synchronous demodulators and any further processing, can be implemented in either software (such as a Digital Signal Processor (DSP) programmed into an Application Specific Integrated Circuit), or hardware such as an analogue circuitry, or both, and are typically provided with a combination of software and hardware.

A basic form of the repeating transmit signal cycle of the present invention includes at least a non-zero transmit coil reactive voltage period and at least a receive period of a zero transmit coil reactive voltage period, during which a constant non-zero current flows through the transmit coil. The transmit coil reactive voltage is related to the transmit coil current through $L di/dt$, where i is the transmit coil current and L is the effective inductance of the transmit coil. Hence, a non-zero transmit coil reactive voltage implies a changing (non-constant) current.

The applied voltage, v, equals $L di/dt + Ri$, where R is the effective transmit coil resistance. Note that it is known to a person skilled in the art that reactive voltage is not equal to the voltage applied across the transmit coil, unless there happens to be no current flowing through the coil (i=0).

Figure 2:
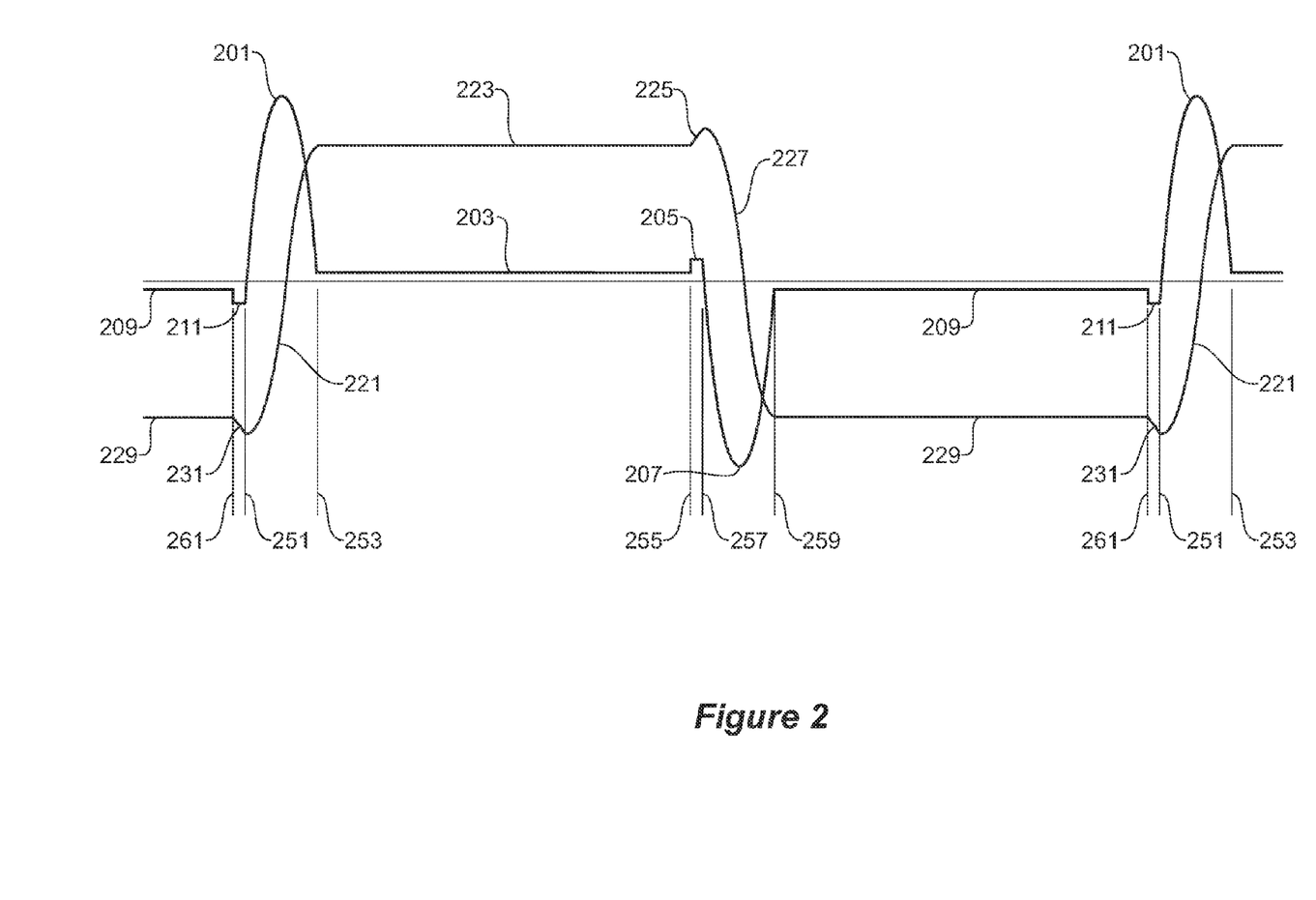
FIG. 2 depicts an example voltage waveform of the repeating transmit signal cycle with its corresponding transmit coil current, being one of the possible transmit waveforms generated by the electronic circuit depicted in block diagram in FIG. 3.

FIG. 2 shows a form of the repeating transmit signal cycle applied to the transmit coil, where the repeating transmit signal cycle includes two different sequences. In a very basic form, only one sequence is required and, within that sequence, only one non-zero transmit coil reactive voltage period and one receive period are required.

The first sequence includes a first non-zero transmit coil reactive voltage period (between times 251 and 253), a first receive period (between times 253 and 255) immediately following the first non-zero transmit coil reactive voltage period, and a first low-voltage period (between times 255 and 257) immediately following the first receive period. The second sequence includes a second non-zero transmit coil reactive voltage period (between times 257 and 259), a second receive period (between times 259 and 261) immediately following the second non-zero transmit coil reactive voltage period, and a second low-voltage period (between times 261 and 251) immediately following the second receive period.

In this embodiment, the voltage waveform of the repeating transmit signal cycle resembles a half-sine wave 201 with corresponding current resembling a half-cosine wave 221 during the first non-zero transmit coil reactive voltage period. The peak voltage of the half-sine wave 201 is at a level greater than both an average voltage during the first receive period and an average voltage during the first low-voltage period. Accordingly, it is also possible to refer to the first non-zero transmit coil reactive voltage period as a first high-voltage period.

The voltage is at a relatively very low level 203 during the first receive period. The very low level 203 is selected such that the current through the transmit coil is constant 223 ($I_0$) during the first receive period. A receive signal can be processed during the first receive period. During the first low-voltage period, the voltage, u, applied across the transmit coil is at a relatively low level 205 (greater than the relatively very low level 203 but less than the peak of the half-sine wave 201) such that the current though the transmit coil is changing, in this case increasing approximately linearly ($I_0 \exp[-t/\tau] + u/R(1 - \exp[-t/\tau]$ where $\tau = L/R$) in a positive direction 225. In this embodiment, the second non-zero transmit coil reactive voltage period, the second receive period and the second low-voltage period are generally the same as, but inverted in the sense of polarity with respect to, the first non-zero transmit coil reactive voltage period, the first receive period and the first low-voltage period respectively. Accordingly, the characteristics of the voltage waveform 207, 209 and 211, and the corresponding current 227, 229 and 231 during the second sequence are, apart from being an inversion of those of the first sequence, generally the same with the characteristics of the voltage waveform 201, 203 and 205, and the corresponding current 221, 223 and 225 during the first sequence.

Any non-zero transmit coil reactive voltage period, high-voltage period, low-voltage period, and very-low-voltage period requires only at least one period of non-zero transmit coil reactive voltage, switched high voltage, switched low-voltage and switched very low-voltage respectively.

Durations of non-zero transmit coil reactive voltage, switched high voltage, switched low voltage and switched very low voltage do not require continuous non-zero transmit coil reactive voltage, switched high voltage, switched low voltage and switched very low voltage; rather, they require only an average non-zero transmit coil reactive voltage, switched high voltage, switched low voltage and switched very low voltage respectively. The term "average" in the context of this description of embodiments could include a meaning generally understood by a person skilled in the art and could include a robust average where the calculation for average is not biased by outliers.

It is possible to change the order of occurrence of the various periods within the repeating transmit signal cycle. For example, as an alternative embodiment, the repeating transmit signal cycle includes a high-voltage period, the high-voltage period immediately followed by a first low-voltage period, the first low-voltage period immediately followed by a substantially zero-current period, and the substantially zero-current period immediately followed by a second low-voltage period; and that the high-voltage period includes at least one non-zero transmit coil reactive voltage period, and the substantially zero-current period includes the at least one receive period.

Figure 3:
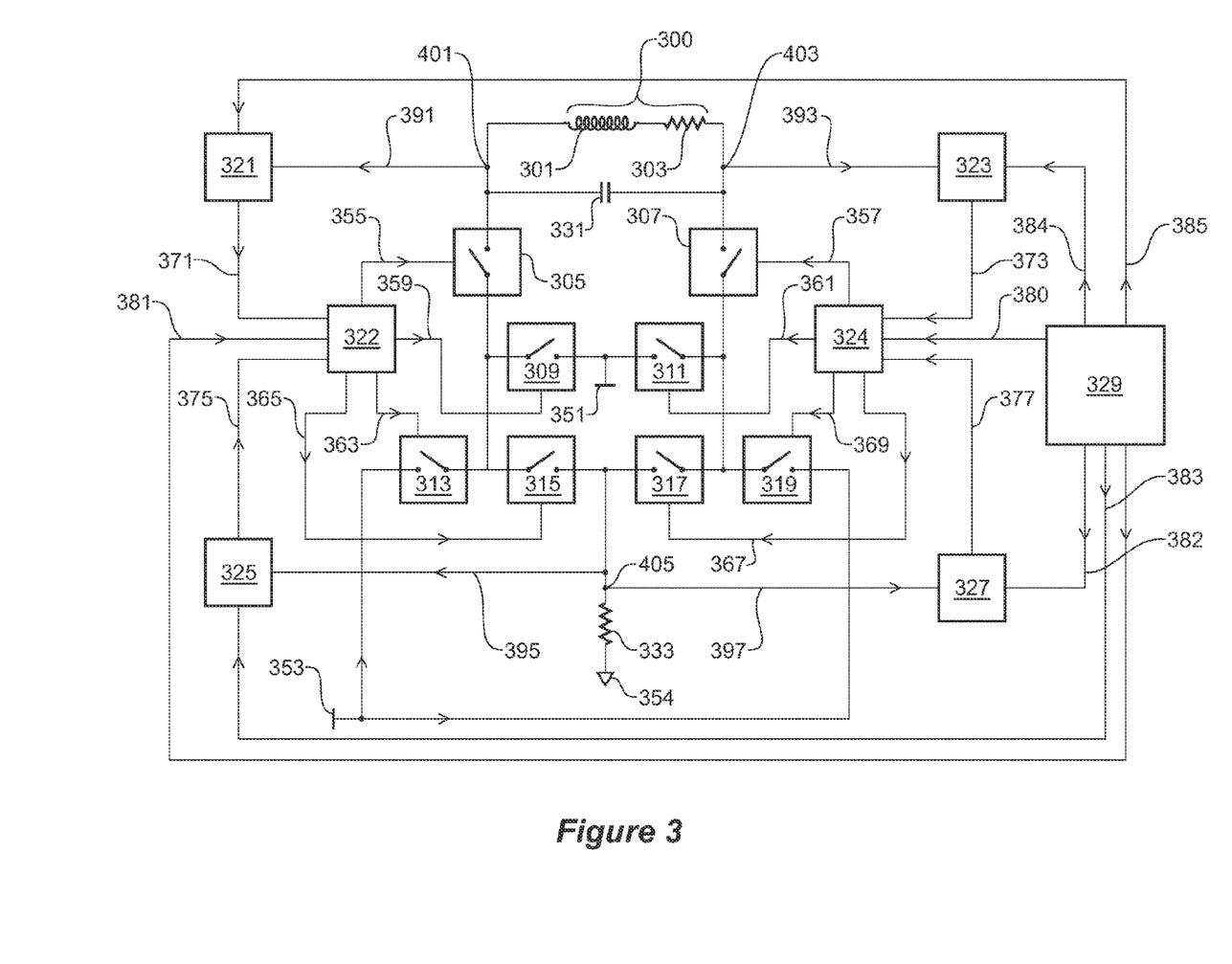
FIG. 3 depicts a block electronic circuit diagram of one embodiment of the invention with an electronic system capable of producing a repeating transmit signal cycle including low-voltage periods of constant current and zero reactive voltage.

FIG. 3 shows an embodiment of the switching circuit of the transmit electronics 101 (FIG. 1) capable of producing the repeating transmit signal cycle of FIG. 2. In FIG. 3, transmit coil 300, which is represented by an inductor 301 (L) and a resistor 303 (R), is connected to transmit electronics including switches 305, 307, 309, 311, 313, 315, 317 and 319, switch controls 322 and 324, feedback controls 321, 323, 325 and 327, timing control 329, and power sources 351 and 353. A capacitor 331 is connected across terminals 401 and 403 of the transmit coil 300. Switch control 322 controls switches 305, 309, 313 and 315 through connections 355, 359, 363 and 365 respectively, while switch control 324 controls switches 307, 311, 317, 319 through connections 357, 361, 367 and 369 respectively. Alternatively, all the switches can be controlled by one single switch control entity. The two switch controls 322 and 324 are shown as two separate entities to simplify the connections in FIG. 3.

Referring to FIG. 3, when switches 305 and 309 are switched "on" (also known as in a low-impedance state or switched-on state) with switches 313 and 315 switched "off"

(also known as in a high-impedance state or switched-off state), power source 351 is connected to terminal 401. If at a same time switches 307, 317 are switched "on" with switches 311 and 319 switched "off", current flows from source 351 to ground 354 through inductor 301, resistor 303 and small-value resistor 333. By controlling switches 305, 307, 309, 311, 313, 315, 317, 319 using switch controls 322 and 324, voltage from sources 351 and 353 can be switched to either one of terminals 401 and 403 at any particular time. Small-value resistor 333, connected to a ground 354, has a very small resistance (e.g. 0.05Ω), across which a voltage proportional to the transmit coil current can be measured, through connections 395 and 397, by feedback controls 325 and 327 respectively. The voltages at terminals 401 and 403 are also measured through connections 391 and 393 by feedback controls 321 and 323 respectively. Together with timing information from timing control 329, the four feedback controls 321, 323, 325 and 327 control switching controls 322 and 324, which in turn switch 305, 307, 309, 311, 313, 315, 317 and 319 accordingly.

There are two power sources shown in FIG. 3, source 351 and source 353. One of the power sources provides a lesser voltage than does the other. In one embodiment, source 351 provides, for example, +1V, while the source 353 provides, for example, +5V. The power sources can also be configured to provide negative voltage (e.g. −1V, −5V etc.). In any case, a same repeating transmit signal cycle can be produced by changing the switching sequence of switches through switch controls 322 and 324. Alternatively, a single power source with multiple different voltage outputs can be used to replace sources 351 and 353.

Figure 4:
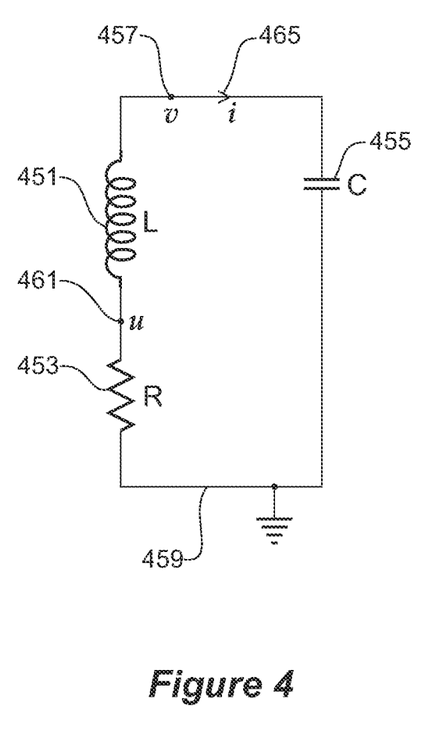
FIG. 4 depicts a circuit diagram relating the example voltage waveform to its corresponding current shown in FIG. 2.

FIG. 4 shows a circuit diagram explaining the production of the repeating transmit signal cycle shown in FIG. 2 using circuits shown in FIG. 3. The inductor 451, resistor 453 and capacitor 455 represent inductor 301, resistor 303 and capacitor 331 of FIG. 3, respectively.

In this circuit, the orders of the values of the components are such that:

$$\left(\frac{1}{2\tau}\right)^2 \ll \omega^2 \tag{1}$$

where $$\omega = \sqrt{\frac{1}{LC} - \left(\frac{R}{2L}\right)^2}$$

Thus waveforms 201 and 207 when at least one of switches 305 or 307 is switched off are of the form $$v = -I_0 e^{\frac{R}{2L}t}\left(\frac{1}{\omega C}\sin\omega t + R\cos\omega t\right) \tag{2}$$

and waveforms 221 and 227 are of the form $$i \approx I_0(\cos\omega t + \omega RC \sin\omega t) \tag{3}$$

In order for the approximation of Equation (3) to hold, the combinations of values of particular parameters need to be such that $$e^{\frac{-R}{2L}t} \approx 1,$$

for example L≈3×10⁻⁴ H, R≈0.5Ω and t<10⁻⁵ s.

Referring back to FIGS. 2 and 3, from time 261 to time 251, source 353 (e.g. −5V) is applied to the transmit coil 300, through control of switches using switch controls 322 and 324, for example, with switches 305, 307, 313 and 317 switched "on" with the rest of the switches switched "off", to generate voltage waveform 211. At time 251, at least one of switches 305 or 307 is switched "off" so that at least one end of the inductor 300 (either 401 or 403, depending on the semiconductor "polarities" and power source polarities) and capacitor 331 is isolated, thus forming the circuit as described with reference to FIG. 4. The voltage and the corresponding current will take a form according to Equations (2) and (3) above, which is illustrated as 201 and 221.

At time 253, at a point (for example at 1V in this case) when there is no voltage drop across the inductor 301, source 351 (e.g. −1V) is applied to the transmit coil 300, through control of switches using switch control 322 and switch control 324, for example with switches 305, 307, 311, 315 switched "on" with the rest of the switches switched "off". The very small voltage 203 applied across the inductor 300, remains the current 223 constant between times 253 and 255.

At time 255, source 353 is switched across the transmit coil again, but in an opposite sense, for example, with switches 305, 307, 315 and 319 switched "on" with the rest of the switches switched "off", to generate voltage waveform 205. Similarly, except for the reversed polarity, voltage waveform 207 and 209 are generated using method described above for voltage waveform 201 and 203.

To ensure that 253 always occurs at a right time when there is no reactive voltage drop across the inductor 301 of the transmit coil 300, feedback loops involving feedback controls 321, 323, 325, 327 which measure voltage at points 401, 403, and current at point 405 through connection 391, 393, 395 and 397 are used. Based on the measured voltage and current, the four feedback controls 321, 323, 325, 327 control switch controls 322 and 324 through connection 371, 373, 375, and 377, respectively. Timing control synchronises the time of feedback controls 321, 323, 325 and 327, with the time of the switch controls 322 and 324, by supplying timing signal through connection 380, 381, 382, 383, 384 and 385, respectively.

Accordingly, the times 251, 253, 255, 257, 259 and 261 can be controlled so as to change the duration of one or more of the non-zero transmit coil reactive voltage periods, receive periods and low-voltage periods of the repeating transmit signal cycle so that at times 253 and 259, there is no reactive voltage drop across the inductor 301 of transmit coil 300. In this embodiment as illustrated and described, it is the one or more durations of periods that are controlled based on the measured voltage and current though the negative feedback loops. However, it is possible to achieve the same by changing one or more of the voltage levels using feedback loop-controlled variable power sources while maintaining times 251, 253, 255, 257, 259 and 261. It is also possible to control voltage levels and/or durations or both to produce zero reactive voltage drop across the inductor 300 during the constant current receive periods.

In one embodiment, each of the feedback loops, involving feedback controls 321, 323, 325 and 327, has its own function. Examples of functions include, but are not limited to:
1. Controlling the voltage applied to the electronics to be constant for the receive period;
2. Controlling the current during the receive period to be constant;
3. Controlling the average value of the current during the receive period for every repeating transmit signal cycle to be the same;

4. Controlling the peak voltage during the non-zero transmit coil reactive voltage period for every repeating transmit signal cycle to be the same;
5. Controlling the mean voltage during the non-zero transmit coil reactive voltage period for every repeating transmit signal cycle to be the same; and
6. Controlling some other function of the half-sine voltage waveform during the non-zero transmit coil reactive voltage period for every repeating transmit signal cycle to be the same, for example RMS value, or some features to assist improve insensitivity to VRM during a process of the receive signal, in particular during a demodulation of the receive signal).

To performed any of the aforementioned functions, it is possible to adjust one or more variables, examples of which include but are not limited to, the duration of the low-voltage period to compensate for energy losses during the non-zero transmit coil reactive voltage period, the time of commencement of the half-sine non-zero transmit coil reactive voltage period and the level of the very low voltage applied during the receive period.

For ideal electronics, the resonant frequency is $1/\sqrt{LC}$ radians per second. Thus, if L changes as it is modulated by the magnetic permeability of the soil, the non-zero transmit coil reactive voltage period changes as a function of $\sqrt{LC}$ as does the peak voltage during the non-zero transmit coil reactive voltage period.

The inductance of the transmit coil is modulated both reactively (pure X, non-VRM) and resistively (R, including VRM). Both of these need compensation for ideal results, in particular:

i.) Reactive transmit coil inductance modulation which is typically 100 times more than resistive transmit coil inductance modulation;
ii.) Resistive modulation of the transmit coil current during the zero constant reactive voltage receive period (measurement required to maintain each period to have constant current); and
iii.) VRM "contamination" during the measurement of reactive signal either during the short energy compensation pulse (the low-voltage period), or the half-sine high-voltage period, or both.

While the waveform of the repeating transmit signal cycle during the non-zero transmit coil reactive voltage shown in FIG. 2 resembles a half-sine, it is not necessarily a prefect half-sine.

In one embodiment, with reference to FIGS. 2 and 3, capacitor 331 is approximately 8.4 nF with the inductor 301 being approximately 0.3 mH, such that the resonant frequency of the resonant circuit including transmit coil 300 is approximately 100 kHz. The switches may be FETs. A FET has an output capacitance which varies non-linearly with the voltage applied to its output, and thus the output capacitance of switches 305 and 307, which are FETs in this embodiment, would affect the slope of the waveform slightly when the output capacitances of switches 305 and 307 are of comparative magnitude to that of capacitor 331. For example, the output capacitance for a particular type of FET may be 300 pF when the voltage is >=30V which is much smaller than 8.4 nF of capacitor 331. At 0V however, the output capacitance would be about 5 nF, and at 3V about 2 nF, which is comparable to 8.4 nF of capacitor 331.

Thus, when the absolute voltage of the waveform during the non-zero transmit coil reactive voltage period is say <3V, the absolute rate of change of the back-emf would decrease progressively with time as the said absolute voltage at the output of the FET approaches zero. The rate of change of the back-emf is roughly proportional to $1/\sqrt{(totalcapacitance)}$. When the back-emf is high, its rate of change is substantially due to the independent capacitor 331 plus the approximate 300 pF of the FET, that is it is proportional to $\sim 1/\sqrt{8.7nF}$. At around zero volts back-emf, the capacitance of the output of the FET approaches that of independent capacitor 331; again, the rate of change of dependent capacitance is proportional to a function of the sum of the two capacitances, in this case highly variable with voltage with a peak of $\sim 1/\sqrt{13nF}$ at 0V. Accordingly, when the back-emf is around 0V, its rate of change will deviate relative to the rate at high voltage by up to $1/\sqrt{13nF/8.7nF}$. This will normally only happen when the voltage is <3V. Accordingly, the voltage waveform is not necessarily a perfect half-sine, but still closely resembles a half-sine waveform as the voltage <3V occurs for a relatively very short duration compared to the rest of the half-sine wave.

An ideal repeating transmit reactive voltage signal of fundamental period of 2 units, consisting of a positive half sine high voltage period of T, followed by a constant positive current of period 1-T, followed by the same signal but of opposite polarity; a negative half sine high voltage period of T, followed by a negative constant current of period 1-T, whereafter the transmit waveform repeats, produces an ideal induced receive emf signal in a receive coil due to log-uniform VRM interrogated medium of approximately:

$$\frac{2}{\pi}\left\{\ln\left[\frac{\Gamma\left(\frac{T+t}{2}\right)\Gamma\left(\frac{1+t}{2}\right)}{\Gamma\left(\frac{t}{2}\right)\Gamma\left(\frac{1+T+t}{2}\right)}\right] + \ln\left(\frac{T+t}{2}\right)\right\} - \qquad (4)$$

$$\cos\left(\pi\frac{t}{T}\right)\left\{si\left[\pi\left(1+\frac{t}{T}\right)\right] - si\left(\pi\frac{t}{T}\right)\right\} +$$

$$\sin\left(\pi\frac{t}{T}\right)\left\{ci\left[\pi\left(1+\frac{t}{T}\right)\right] - ci\left(\pi\frac{t}{T}\right)\right\}$$

where $si[x]$ is the sine integral $\int_x^\infty \frac{\sin z}{z} dz$, and $ci[x]$ is the cosine integral $\int_x^\infty \frac{\cos z}{z} dz$ to a high degree of accuracy for typical reasonable values of T (e.g. 0.02).

Figure 5:
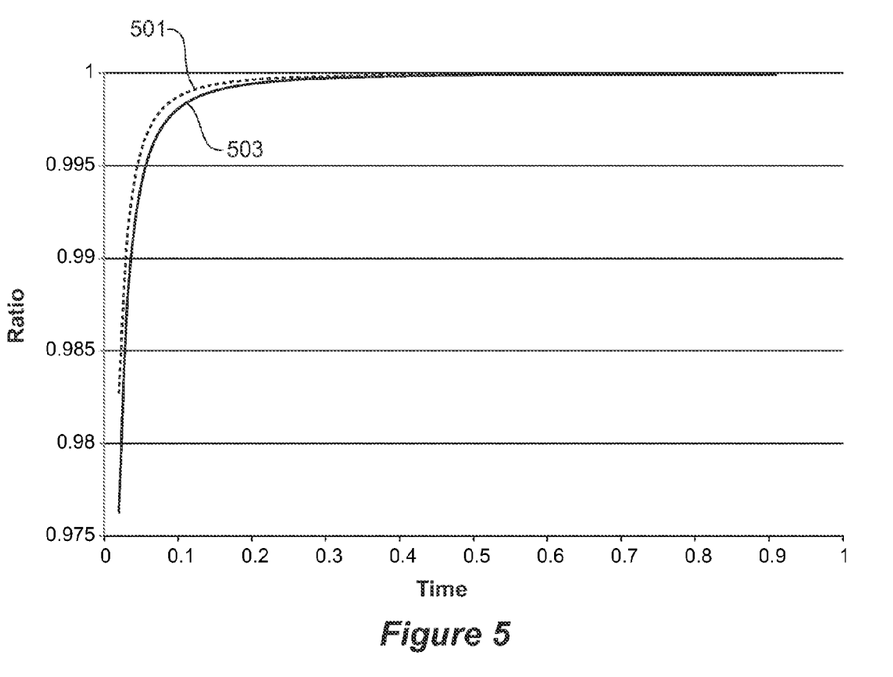
FIG. 5 depicts a graph showing the ratio of a receive signal due to the VRM (Viscous Remanent Magnetisation) of Equation (4), to a receive signal due to VRM in response to a transit signal with rectangular high voltage periods instead of half-sine high voltage periods.

FIG. 5 depicts a graph with trace 501 showing the ratio of a receive signal due to the above log-uniform VRM, to a receive signal due to VRM in response to a transmit signal identical except for having rectangular high voltage periods instead of half-sine high voltage periods, normalised to the same average high voltage during the high voltage periods. Trace 501 shows that the responses are almost the same, thus half-sine high voltage pulses produce similar responses to rectangular high voltage pulse periods.

With log-linear VRM, half-sine high voltage pulses also produce similar response signals as produced with rectangular high-voltage. Trace 503 shows the ratio of a receive signal due to the log-linear VRM with a transmit signal, identical except with rectangular high voltage periods, and a receive signal due to the log linear VRM in response to a transmit signal with half-sine high voltage periods, normalised to the same average high voltage during the high voltage periods, and with the log-uniform VRM component mathematically removed.

As mentioned before, it is not necessary to have a prefect half sine-wave to effect the current invention, as long as the high-voltage period includes a period of a waveform which is "substantially" half-sine. For a waveform to qualify as a "substantially" half-sine, the waveform should result in comparable results with a prefect half-sine. Through investigations, it has been found that for a waveform to qualify as a "substantially" half-sine, the waveform must achieve the final result of the following test procedures:

1) Construct a "full" version of the sinus waveform under consideration from its original form in a manner similar to constructing a sine wave from a half-sine wave;
2) Generate a continuously repeating "full" version of the sinus waveform; and
3) Analyse the frequency components of the continuously repeating "full" version of the waveform.

For a perfect sine wave under perfect testing conditions (which in not possible in practice), there should be only one single frequency component at the frequency of the perfect sine wave. In practice, the perfect sine-wave should result in a frequency component at the frequency of the perfect sine wave with a magnitude of >95% when compared with the total of the magnitudes of all frequency components.

For a waveform to qualify as a "substantially" half-sine, it is considered that the frequency components of the continuously repeating "full" version of the waveform must include a frequency component at the frequency of the perfect sine wave with a magnitude of >85% when compared with the total of the magnitudes of all frequency components.

Waveforms that do not qualify as a "substantially" half-sine include a rectangular wave, having a frequency component of the highest magnitude of only around 20% when compared with the total of the magnitudes of all frequency components when the above test procedures are applied. A triangular wave also does not qualify, with a frequency component of the highest magnitude of around 80%

Examples of suitable coil arrangement for the waveform shown in FIG. 2 are described below. The first example 601 of suitable coil arrangement, shown in FIG. 6, includes one centrally placed transmit coil (Tx) 603 with two receive coils (Rx1 and Rx2), 605 and 607, each of the receive coils 605 and 607 magnetically nulled to the transmit coil 603. The receive coils 605 and 607 are placed approximately coplanar with the transmit coil 603 and at opposite sides of the transmit coil 603 and are connected in series such that their signals are additively combined. The transmit coil 603 is shaped approximately as a circle. The receive coils 605 and 607 are approximately "D"-shaped coils, overlapping the transmit coil 603 to effect the magnetic nulls required. They are placed with one as a mirror image of the other. This arrangement lends itself to the appellation "DOD" coil. This configuration has the advantage of reducing signals from soil surface anomalies, besides being able to reduce non-linear motion signals. In one embodiment, receive coils 605 and 607 and the transmit coil 603 are protected by a casing 609.

Figure 6:
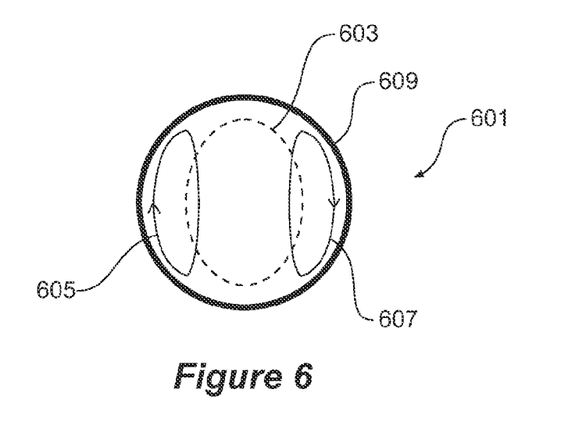
FIGS. 6 to 9 depict various embodiments of coil arrangements according to the aspects of the present invention.

As there are two receive coils and only one transmit coil, there will be two different "transmit coil-environment-receive coil" transfer functions, namely "transmit coil-environment-first receive coil" and "transmit coil-environment-second receive coil" transfer functions. Each of these two transfer functions should have a gain within 20% of the other. One way through which this can generally be achieved is by having the number of turns of wire and the shapes of the receive coils being the same, along with the required symmetry of placement of the Tx and Rx coils.

Alternatively, each of the receive coils 605 and 607 may feed its receive signal to a preamplifier whose outputs may be added in approximate inverse proportion to the relative forward transfer function of "transit coil-environment-receive" coil system of each receive-transmit pair.

In another embodiment (not shown), a 'DD' coil arrangement is with its transmit coil arranged so as to be vertically separated from its receive coil. With the transmit coil at least 2 cm above the receive coil, the effects of saturation of the soil near the windings of the transmit coil are reduced, in turn reducing the non-linear motion signal components.

Alternatively, the receive coil is at least 2 cm above the transmit coil. This has the effect of reducing the linkage flux of the field due to the non-linear motion signal with the turns of the receive coil. The magnetic effects that produce the non-linear motion signal components are generated close to the Tx windings, so the strength of the magnetic field that they generate has effect over limited distance.

In another embodiment, the 'DOD' coil arrangement, described previously with respect to FIG. 6, is with its transmit coil separated vertically from the receive coil. In one alternative, the transmit coil 603 is placed at least 2 cm higher than the receive coils 605 and 607, thus the saturation of soil is reduced, further reducing the total non-linear motion signal components. In another alternative the receive coils 605 and 607 are coplanar in a plane at least 2 cm higher than the plane of that of the transmit coil 603.

Figure 7:
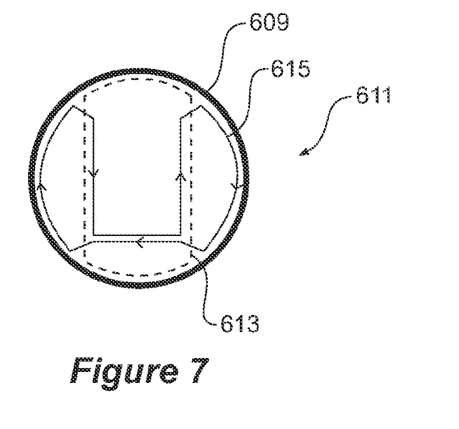

In another embodiment 611 as shown in FIG. 7, there is one receive coil (Rx) 615 and one transmit coil (Tx) 613, the receive coil 615 being wound continuously in two halves either side of the transmit coil 613. The senses of the two halves (indicated by arrows in FIG. 7) are such that the signals due to each half are additive.

Figure 8:
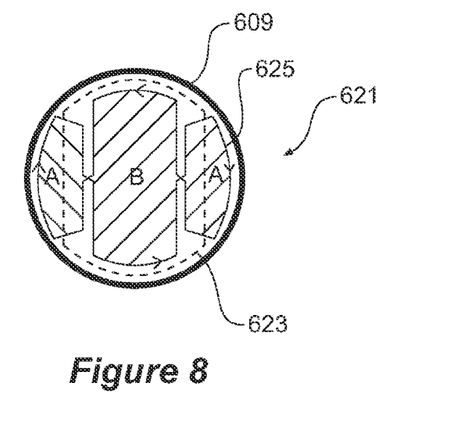

In another embodiment 621 as shown in FIG. 8, there is one transmit coil (Tx) 623 and one receive coil (Rx) 625, the receive coil 625 be continuously wound and in such a way that it has three open loops. One of the loops, the middle loop, is placed entirely within the horizontal limits of the transmit coil 623, the other two loops overlap the turns of the transmit coil 623. The middle loop has its turns wound such that its sense is opposing that of the other two loops. The sum of the area-turns product of the two outer loops (A+A) is equal to the area-turns product of the middle loop (B); this provides insensitivity to EMI for the receive coil 625.

Collectively, the three loops are arranged so as to effect a magnetic null with the transmit coil 623 for the sum of the signals induced in the loops from the field directly from the transmit coil 623.

Alternatively, for the embodiment just described and illustrated in FIG. 8, the transmit coil 623 is vertically separated from the receive coil by at least 2 cm.

Figure 9:
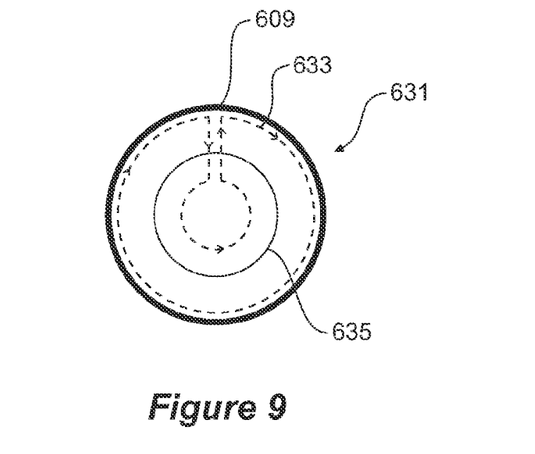

In another embodiment 631 as shown in FIG. 9, the coil arrangement connected to a metal detector is configured such that it is similar to the well-known concentric coil. This arrangement is such that the transmit coil (Tx) 633 consists of two loops continuously wound and the receive coil (Rx) 635 is of one loop. The numbers of turns in the transmit loops of the transmit coil 633 and their positions with respect to the loop of the receive coil 635 are configured so as to effect a magnetic null between the transmit coil 633 and the receive coil 635. In one embodiment, the transmit coil 633 is placed higher than the receive coil 635 by at least 2 cm.

It was discovered that the coil arrangements of FIGS. 6 to 9 can reduce or eliminate the non-linear motion signal for any repeating transmit waveform with a zero transmit coil reactive voltage period.

Patent Application WO 2008/040089 "Metal Detector With Improved Magnetic Response Cancellation" describes the creation and cancellation of a linear motion signal, produced when the sensor head of a CW detector is passed over mineralised ground. During a demodulation window of the R component with non-zero current flowing through the transmit coil, the receive coil moves a small distance through the magnetic field returned from the ground. While the transmitted magnetic field, and therefore the return instantaneous response of the ground, is not changing with time, the receive coil moves through the spatial variations of the return magnetic field that exist because of the spatial variations of the transmit magnetic field. This movement thereby induces a component of receive signal that is proportional to dX/dt. It can be cancelled by measuring the X signal, then subtracting a proportion of the time differential of that measured X signal. This component of the R signal, proportional to the dX/dt induced by the movement of the receive coil during the periods of sensing the R response, is not the subject of this discussion.

There is another signal induced in the receive coil during periods of zero reactive voltage across the transmit coil that is observed only when the coil is moving over the ground. It is dependent upon both the speed of the coils over the ground and the direction of the coils over the ground with respect to whether it is, for example in a DD coil, the transmit coil or the receive coil that is leading the movement of the sensor head. This signal is due to non-linear reactions of magnetic components of saturable ground that have the property of viscous superparamagnetism. This signal, the non-linear motion signal, is present even when the linear motion signal, proportional to dX/dt, is equal to zero, that is, it is not dependent upon dX/dt and cannot be cancelled by subtracting a proportion of the time differential of the measured X response.

In soils that have high mineralisation and that are magnetically saturable, the two types motion signals (linear and non-linear) can have similar magnitudes, making the elimination of the non-linear motion signal just as necessary as the elimination of the signal proportional to dX/dt.

The well-known "concentric coil", which has both its transmit and receive windings as circles with a common centre, will attenuate the non-linear motion signal because of the symmetry of Rx and Tx coils within the sensor head, but other, better alternative configurations are described with reference to FIGS. 6 to 9. These alternative configurations also offer solutions that, in combination with electronics, are less responsive to variations in the surface of the soil than are concentric coils, in much the same way that a 'DD' coil is less responsive to variations in the surface of the soil.

A detailed description of one or more embodiments of the invention is provided below along with accompanying figures that illustrate, by way of example, the principles of the invention. While the invention is described in connection with such embodiments, it should be understood that the invention is not limited to any embodiment. On the contrary, the scope of the invention is limited only by the appended claims and the invention encompasses numerous alternatives, modifications, and equivalents. For the purpose of example, numerous specific details are set forth in the following description in order to provide a thorough understanding of the present invention. The present invention may be practised according to the claims without some or all of these specific details. For the purpose of clarity, technical material that is known in the technical fields related to the invention has not been described in detail so that the present invention is not unnecessarily obscured.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any prior art in this specification is not, and should not be taken as, an acknowledgment or any form of suggestion that such prior art forms part of the common general knowledge of the technical field.

The invention claimed is:

1. A metal detector for detecting a metallic target in a soil including:
   transmit electronics for generating a repeating transmit signal cycle, the repeating transmit signal cycle including at least one receive period and at least one non-zero transmit coil reactive voltage period;
   a transmit coil connected to the transmit electronics for receiving the repeating transmit signal cycle and generating a transmit magnetic field;
   a receive coil for receiving a receive magnetic field during the at least one receive period and providing a receive signal induced by the receive magnetic field; and
   receive electronics connected to the receive coil for processing the receive signal during the at least one receive period to produce an indicator output signal, the indicator output signal including a signal indicative of a presence of the metallic target when under an influence of the transmit magnetic field;
   wherein the repeating transmit signal cycle is generated such that a waveform of the repeating transmit signal cycle includes a substantially half-sine during the at least one non-zero transmit coil reactive voltage period, and that a current through the transmit coil is substantially constant and non-zero during the at least one receive period;
   the metal detector further including one or more feedback loops to control the repeating transmit signal cycle so that there is no reactive voltage drop across the transmit coil during the at least one receive period.

2. The metal detector of claim 1, wherein the repeating transmit signal cycle includes a high voltage period, the high voltage period followed by a very low voltage period;
   wherein the high voltage period includes one of the at least one non zero transmit coil reactive voltage period, and the very low voltage period includes one of the at least one receive period.

3. The metal detector of claim 2, wherein the repeating transmit signal cycle further includes a low voltage period following the very low voltage period.

4. The metal detector of claim 3, further including:
   at least one other negative feedback loop for controlling at least one characteristic of the repeating transmit signal cycle, the controlling based on the at least one characteristic of the repeating transmit signal cycle or at least one other characteristic of the repeating transmit signal cycle.

5. The metal detector of claim 2, wherein the one or more feedback loops control at least one characteristic of the repeating transmit signal cycle to compensate for energy losses during the high-voltage period.

6. The metal detector of claim 2, wherein the one or more feedback loops control the low-voltage period to compensate for energy losses during the high-voltage period.

7. The metal detector of claim 2, further including:
   at least one other negative feedback loop for controlling at least one characteristic of the repeating transmit signal cycle, the controlling based on the at least one characteristic of the repeating transmit signal cycle or at least one other characteristic of the repeating transmit signal cycle.

8. The metal detector of claim 1, wherein the repeating transmit signal cycle includes at least two different sequences, a first sequence and a second sequence, the first sequence including a first non-zero transmit coil reactive voltage period and a first receive period, and the second sequence including a second non-zero transmit coil reactive voltage period and a second receive period, and the second sequence is an inversion of the first sequence.

9. The metal detector of claim 8, further including:
at least one other negative feedback loop for controlling at least one characteristic of the repeating transmit signal cycle, the controlling based on the at least one characteristic of the repeating transmit signal cycle or at least one other characteristic of the repeating transmit signal cycle.

10. The metal detector of claim 1, further including:
at least one other negative feedback loop for controlling at least one characteristic of the repeating transmit signal cycle, the controlling based on the at least one characteristic of the repeating transmit signal cycle or at least one other characteristic of the repeating transmit signal cycle.

11. The metal detector of claim 1, wherein the metal detector includes one transmit coil and two receive coils, and wherein the two receive coils are positioned at opposite sides of the transmit coil in order to reduce non-linear motion signals in the receive signal of the metal detector, the non-linear motion signals being due to non-linear characteristics of magnetic components of the soil and movement of the transmit and receive coils over the soil.

12. The metal detector of claim 1, wherein the receive coil includes three loops, wherein a first loop is positioned entirely within horizontal limits of the transmit coil, and the remaining loops of the three loops have parts overlapping turns of the transmit coil in order to reduce non-linear motion signals in the receive signal of the metal detector, the non-linear motion signals being due to non-linear characteristics of magnetic components of the soil and movement of the transmit and receive coils over the soil.

13. The metal detector of claim 1, wherein the receive coil includes two loops, each loop positioned at opposite sides of the transmit coil in order to reduce non-linear motion signals in the receive signal of the metal detector, the non-linear motion signals being due to non-linear characteristics of magnetic components of the soil and movement of the transmit and receive coils over the soil.

14. The metal detector of claim 1, wherein the transmit coil includes two loops, wherein the two loops of the transmit coil and the receive coil form a concentric arrangement in order to reduce non-linear motion signals in the receive signal of the metal detector, the non-linear motion signals being due to non-linear characteristics of magnetic components of the soil and movement of the transmit and receive coils over the soil.

15. A method for detecting a metallic target in a soil including:
generating a repeating transmit signal cycle, the repeating transmit signal cycle including at least one receive period and at least one non-zero transmit coil reactive voltage period;
generating a transmit magnetic field for transmission through a transmit coil based on the repeating transmit signal cycle;
receiving a receive magnetic field during the at least one receive period and providing a receive signal induced by the receive magnetic field; and
producing an indicator output signal, the indicator output signal including a signal indicative of a presence of the metallic target when under an influence of the transmit magnetic field;
wherein the repeating transmit signal cycle is generated such that a waveform of the repeating transmit signal cycle includes a substantially half-sine during the at least one non-zero transmit coil reactive voltage period, and that a current through the transmit coil is substantially constant and non-zero during the at least one receive period;
the method further including controlling the repeating transmit signal cycle so that there is no reactive voltage drop across the transmit coil during the at least one receive period.

* * * * *